US012694291B2

(12) United States Patent
Ba et al.

(10) Patent No.: US 12,694,291 B2
(45) Date of Patent: Jul. 28, 2026

(54) AUTOMATED DRIFT DETECTION IN MULTIDIMENSIONAL DATA

(71) Applicant: International Business Machines Corporation, Armonk, NY (US)

(72) Inventors: Amadou Ba, Navan (IE); Bradley Eck, Dublin (IE); Duygu Kabakci Zorlu, Dublin (IE)

(73) Assignee: International Business Machines Corporation, Armonk, NY (US)

( * ) Notice: Subject to any disclaimer, the term of this patent is extended or adjusted under 35 U.S.C. 154(b) by 758 days.

(21) Appl. No.: 18/175,047

(22) Filed: Feb. 27, 2023

(65) Prior Publication Data

US 2024/0289608 A1 Aug. 29, 2024

(51) Int. Cl.
*G06N 3/08* (2023.01)
*G06N 3/045* (2023.01)

(52) U.S. Cl.
CPC .............. *G06N 3/08* (2013.01); *G06N 3/045* (2023.01)

(58) Field of Classification Search
CPC ................................. G06N 3/08; G06N 3/045
See application file for complete search history.

(56) References Cited

U.S. PATENT DOCUMENTS

| | | | |
|---|---|---|---|
| 8,891,700 B1 | 11/2014 | Kim et al. | |
| 11,227,192 B1 | 1/2022 | Rahnama-Moghaddam et al. | |
| 11,836,163 B1 * | 12/2023 | Iyer ..................... | G06F 16/2365 |

| | | | |
|---|---|---|---|
| 2019/0147357 A1 * | 5/2019 | Erlandson ................ | G06N 7/01 |
| | | | 706/12 |
| 2020/0410403 A1 | 12/2020 | Kamulete | |
| 2022/0036201 A1 | 2/2022 | Tamir et al. | |
| 2022/0126864 A1 * | 4/2022 | Moustafa .......... | B60W 60/0013 |
| 2023/0013470 A1 * | 1/2023 | Tabet .................... | G06F 18/217 |
| 2023/0126323 A1 * | 4/2023 | Tabet .................... | G06N 20/00 |
| | | | 706/12 |
| 2023/0126842 A1 * | 4/2023 | Tabet .................... | G06F 11/079 |
| | | | 714/26 |
| 2024/0394595 A1 * | 11/2024 | Schierz .................... | G06N 5/04 |

FOREIGN PATENT DOCUMENTS

WO WO-2024043888 A1 * 2/2024 ............. G06N 20/00

OTHER PUBLICATIONS

Lu, Jie, et al. "Learning under concept drift: A review." IEEE transactions on knowledge and data engineering 31.12 (2018): 2346-2363. (Year: 2018).*
Greco, Salvatore, and Tania Cerquitelli. "Drift lens: Real-time unsupervised concept drift detection by evaluating per-label embedding distributions." 2021 International Conference on Data Mining Workshops (ICDMW). IEEE, 2021. (Year: 2021).*

(Continued)

*Primary Examiner* — Randall K. Baldwin
(74) *Attorney, Agent, or Firm* — Aaron N. Pontikos

(57) ABSTRACT

Disclosed embodiments provide techniques for automated drift detection in multidimensional data. Disclosed embodiments utilize deep learning to estimate high-density regions of multidimensional, multivariate, and/or multimodal data and combine the results with hypothesis testing. A hypothesis of drift or no drift is tested using a mathematical test, and if drift is detected, mitigation actions, including retraining are performed, to enable the continuation of reliable, high-quality results from the neural network.

19 Claims, 5 Drawing Sheets

(56)  References Cited

OTHER PUBLICATIONS

Eck, Bradley, et al. "A monitoring framework for deployed machine learning models with supply chain examples." 2022 IEEE International Conference on Big Data (Big Data). IEEE, 2022. (Year: 2022).*

Choi, Kukjin, et al. "Deep learning for anomaly detection in time-series data: Review, analysis, and guidelines." IEEE access 9 (2021): 120043-120065. (Year: 2021).*

Piotr Porwik et al., "Detection of data drift in a two-dimensional stream using the Kolmogorov-Smirnov test", 26th International Conference on Knowledge-Based and Intelligent Information & Engineering Systems, KES 2022, pp. 168-175.

Assaf Glazer et al., "Learning High-Density Regions for a Generalized Kolmogorov-Smirnov Test in High-Dimensional Data", Advances in Neural Information Processing Systems, Jan. 2012, 9 pages.

Qiao Liu et al., "Density estimation using deep generative neural networks", PNAS 2021, vol. 118, No. 15, Apr. 8, 2021, 6 pgs.

Denis Dos Reis et al., "Fast Unsupervised Online Drift Detection Using Incremental Kolmogorov-Smirnov Test", KDD '16, Aug. 13-17, 2016, San Francisco, CA, USA, 10 pgs.

Shujian Yu et al., "Request-and-Reverify: Hierarchical Hypothesis Testing for Concept Drift Detection with Expensive Labels", Jun. 28, 2018, 7 pgs.

Hines et al. "Data Drift Detection Part I: Multivariate Drift with Tabular Data", retrieved from web Data Arthur, Jul. 12, 2022, 4 pages.

Liu et al. "Regional Concept Drift Detection and Density Synchronized Drift Adaptation", Proceedings of the Twenty-Sixth International Joint Conference on Artificial Intelligence (IJCAI-17), Aug. 19, 2017, 7 pages.

* cited by examiner

100 ⬉

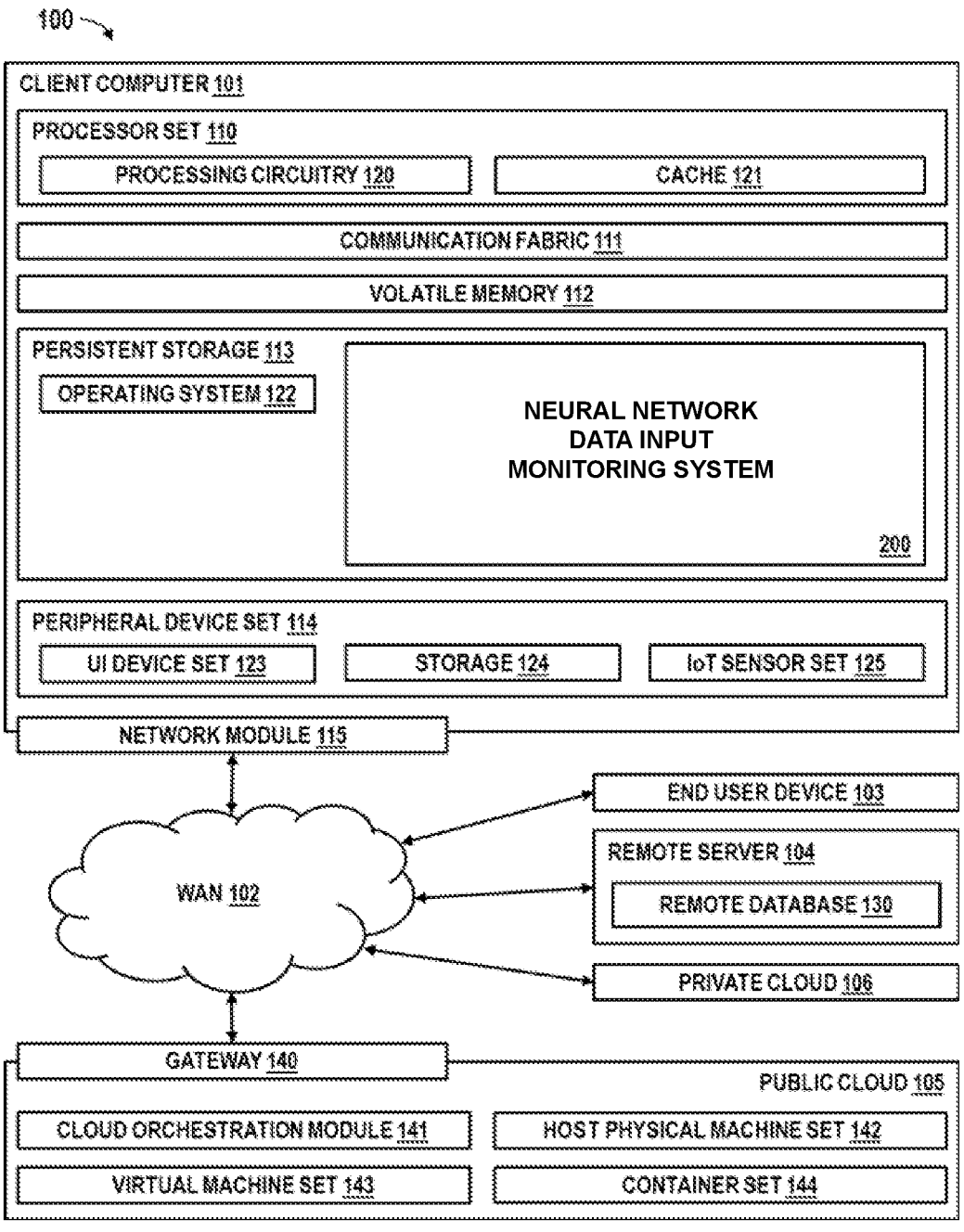

CLIENT COMPUTER 101

PROCESSOR SET 110

PROCESSING CIRCUITRY 120          CACHE 121

COMMUNICATION FABRIC 111

VOLATILE MEMORY 112

PERSISTENT STORAGE 113

OPERATING SYSTEM 122

NEURAL NETWORK
DATA INPUT
MONITORING SYSTEM

200

PERIPHERAL DEVICE SET 114

UI DEVICE SET 123          STORAGE 124          IoT SENSOR SET 125

NETWORK MODULE 115

WAN 102

END USER DEVICE 103

REMOTE SERVER 104

REMOTE DATABASE 130

PRIVATE CLOUD 106

GATEWAY 140

PUBLIC CLOUD 105

CLOUD ORCHESTRATION MODULE 141          HOST PHYSICAL MACHINE SET 142

VIRTUAL MACHINE SET 143          CONTAINER SET 144

408 HYPOTHESIS STORAGE (H0, H1)

410 PERFORM KS TEST

412 DETERMINE P-VALUES

414 MONITOR NEURAL NETWORK

416 DETECT DRIFT

418 EXECUTE MITIGATION

406 DEEP LEARNING HIGH-DENSITY REGION ESTIMATION

404 MULTIDIMENSIONAL MULTIVARIATE MULTIMODAL INPUT DATA

402 PHYSICAL SYSTEM

500

*DATA DRIFT CONFIGURATION*

ENTER THRESHOLD (0 – 1): 0.7 — 502

MINIMUM VOLUME SETTING (0 – 1): 0.35 — 504

SEND ALERTS ON DATA DRIFT (YES/NO): YES — 506

PAUSE AND RETRAIN ON DATA DRIFT (YES/NO): YES — 508

600

*DATA DRIFT ALERT*

Data Drift Detected at: July 03, 20XX, at 09:45:23 UTC — 602

Mitigation Actions: PAUSE AND RETRAIN: IN PROGRESS — 604

AUTOMATED DRIFT DETECTION IN MULTIDIMENSIONAL DATA

FIELD

The present invention relates generally to neural networks, and more particularly, to automated drift detection in multidimensional data.

BACKGROUND

Neural networks are machine learning algorithms that are modeled after the structure and function of the human brain. They have a wide range of applications, including image recognition, natural language processing, predictive modeling, and recommender systems. As examples, neural networks can be trained to identify objects or patterns in images, and are commonly used for tasks such as image classification, object detection, and facial recognition. Furthermore, they can also be used to process and understand human language, and are commonly used for tasks such as sentiment analysis, machine translation, and speech recognition. Beyond these examples, neural networks are used in a wide variety of additional applications, and new applications and uses for neural networks are continuously being developed.

Many neural networks are trained using supervised learning techniques. Supervised machine learning is a type of machine learning where the algorithm is trained on labeled data, which means that the correct output (or "label") for each example in the training data is known. The algorithm uses this labeled training data to learn the relationship between the input features and the output labels, and can then make predictions on new, unseen data. Supervised learning algorithms include linear regression, logistic regression, decision trees, random forests, and neural networks, among others. The choice of algorithm depends on the specific problem and the nature of the data. With supervised learning, the quality of the predictions made by the algorithm depends on the quality of the training data, as well as the choice of algorithm and its parameters. Furthermore, the quality of the output of such algorithms is related to the quality of the input data.

SUMMARY

In embodiments, there is provided a computer-implemented method for monitoring performance of a neural network, comprising: obtaining input data, wherein the input data comprises multidimensional data; estimating at least one high-density region that has a data volume that exceeds a minimum data volume threshold within the input data; performing a statistical drift detection test on the at least one high-density region; and in response to detecting a drift, executing at least one mitigation action, wherein the at least one mitigation action includes automatic model retraining.

In other embodiments, there is provided an electronic computation device comprising: a processor; a memory coupled to the processor, the memory containing instructions, that when executed by the processor, cause the electronic computation device to: obtain input data, wherein the input data comprises multidimensional data; estimate at least one high-density region that has a data volume that exceeds a minimum data volume threshold within the input data; perform a statistical drift detection test on the at least one high-density region; and in response to detecting a drift, execute at least one mitigation action, wherein the at least one mitigation action includes automatic model retraining.

In another embodiment, there is provided a computer program product for an electronic computation device comprising a computer readable storage medium having program instructions embodied therewith, the program instructions executable by a processor to cause the electronic computation device to: obtain input data, wherein the input data comprises multidimensional data; estimate at least one high-density region that has a data volume that exceeds a minimum data volume threshold within the input data; perform a statistical drift detection test on the at least one high-density region; and in response to detecting a drift, execute at least one mitigation action, wherein the at least one mitigation action includes automatic model retraining.

BRIEF DESCRIPTION OF THE DRAWINGS

FIG. 1 is an exemplary computing environment in accordance with disclosed embodiments.

Figure 2:
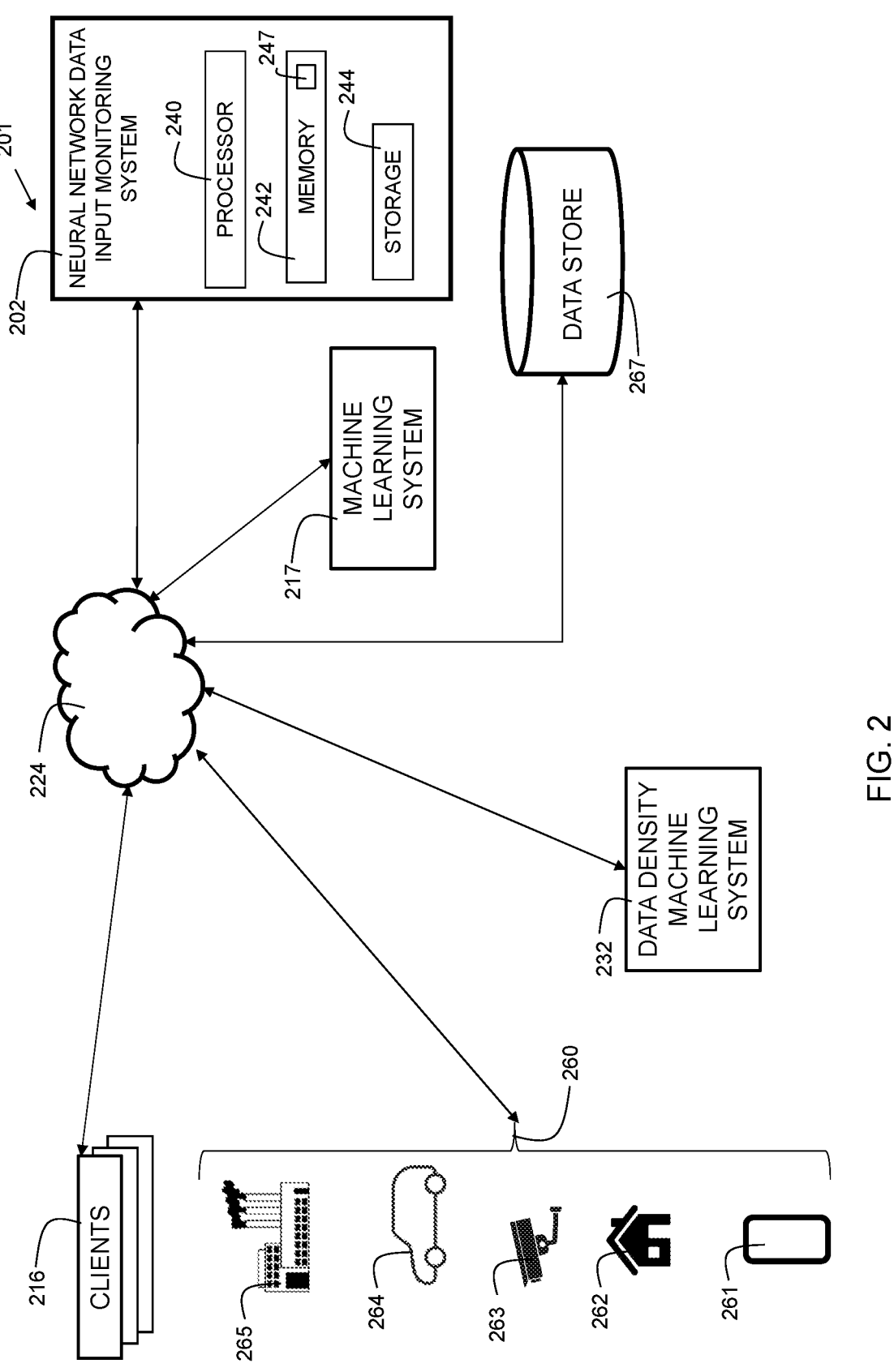
FIG. 2 is an exemplary ecosystem in accordance with disclosed embodiments.

The drawings are not necessarily to scale. The drawings are merely representations, not necessarily intended to portray specific parameters of the invention. The drawings are intended to depict only example embodiments of the invention, and therefore should not be considered as limiting in scope. In the drawings, like numbering may represent like elements. Furthermore, certain elements in some of the Figures may be omitted, or illustrated not-to-scale, for illustrative clarity.

DETAILED DESCRIPTION

Comparing multidimensional distributions is important in many fields. Statistical testing is widespread and critical for a variety of applications but of limited use and application for multivariate, multimodal data. Detecting drift in such datasets can be very challenging, due to the complexity of high-dimensional data. Detecting drift is key for obtaining quality results from trained neural networks. A sequence of temporal data (e.g., time-stamped data) can be referred to as a data stream. The data stream can exhibit a non-stationary distribution if that data varies over time. Large changes in the data stream could have a significant impact on the output of a previously trained neural network. Additionally, in some cases the data arrives very quickly. Such changes in the data distribution must be detected to provide an opportunity for retraining of the neural network on updated training data.

The changes in data, referred to as drift, fall broadly into two categories, data drift, and concept drift. Concept drift involves a change in the output of a model, indicating changes in underlying relationships in the data. Data drift can include a change to the input to a model, including change in data distribution over time, a shift in the mean and/or variance of features, and/or addition/removal of features. Thus, data drift refers to changes in the statistical properties of the data, while concept drift refers to changes in the target concept being modeled. Both types of drift can impact the performance of machine learning models. Disclosed embodiments enable drift detection and data monitoring, thereby enabling neural networks to maintain accurate predictions in the presence of data and/or concept drift.

Disclosed embodiments provide techniques for automated drift detection in multidimensional data. Disclosed embodiments utilize deep learning to estimate high-density regions of multidimensional, multivariate, and/or multimodal data and combine the results with hypothesis testing. A hypothesis of drift or no drift is tested using a mathematical test, and if drift is detected, mitigation actions, including retraining are performed, to enable the continuation of reliable, high-quality results from the neural network.

Reference throughout this specification to "one embodiment," "an embodiment," "some embodiments", or similar language means that a particular feature, structure, or characteristic described in connection with the embodiment is included in at least one embodiment of the present invention. Thus, appearances of the phrases "in one embodiment," "in an embodiment," "in some embodiments", and similar language throughout this specification may, but do not necessarily, all refer to the same embodiment.

Moreover, the described features, structures, or characteristics of the invention may be combined in any suitable manner in one or more embodiments. It will be apparent to those skilled in the art that various modifications and variations can be made to the present invention without departing from the spirit and scope and purpose of the invention. Thus, it is intended that the present invention cover the modifications and variations of this invention provided they come within the scope of the appended claims and their equivalents. Reference will now be made in detail to the preferred embodiments of the invention.

The terminology used herein is for the purpose of describing particular embodiments only and is not intended to be limiting of this disclosure. As used herein, the singular forms "a", "an", and "the" are intended to include the plural forms as well, unless the context clearly indicates otherwise. Furthermore, the use of the terms "a", "an", etc., do not denote a limitation of quantity, but rather denote the presence of at least one of the referenced items. The term "set" is intended to mean a quantity of at least one. It will be further understood that the terms "comprises" and/or "comprising", or "includes" and/or "including", or "has" and/or "having", when used in this specification, specify the presence of stated features, regions, integers, steps, operations, elements, and/or components, but do not preclude the presence or addition of one or more other features, regions, or elements.

Various aspects of the present disclosure are described by narrative text, flowcharts, block diagrams of computer systems and/or block diagrams of the machine logic included in computer program product (CPP) embodiments. With respect to any flowcharts, depending upon the technology involved, the operations can be performed in a different order than what is shown in a given flowchart. For example, again depending upon the technology involved, two operations shown in successive flowchart blocks may be performed in reverse order, as a single integrated step, concurrently, or in a manner at least partially overlapping in time.

A computer program product embodiment ("CPP embodiment" or "CPP") is a term used in the present disclosure to describe any set of one, or more, storage media (also called "mediums") collectively included in a set of one, or more, storage devices that collectively include machine readable code corresponding to instructions and/or data for performing computer operations specified in a given CPP claim. A "storage device" is any tangible device that can retain and store instructions for use by a computer processor. Without limitation, the computer readable storage medium may be an electronic storage medium, a magnetic storage medium, an optical storage medium, an electromagnetic storage medium, a semiconductor storage medium, a mechanical storage medium, or any suitable combination of the foregoing. Some known types of storage devices that include these mediums include: diskette, hard disk, random access memory (RAM), read-only memory (ROM), erasable programmable read-only memory (EPROM or Flash memory), static random access memory (SRAM), compact disc read-only memory (CD-ROM), digital versatile disk (DVD), memory stick, floppy disk, mechanically encoded device (such as punch cards or pits/lands formed in a major surface of a disc) or any suitable combination of the foregoing. A computer readable storage medium, as that term is used in the present disclosure, is not to be construed as storage in the form of transitory signals per se, such as radio waves or other freely propagating electromagnetic waves, electromagnetic waves propagating through a waveguide, light pulses passing through a fiber optic cable, electrical signals communicated through a wire, and/or other transmission media. As will be understood by those of skill in the art, data is typically moved at some occasional points in time during normal operations of a storage device, such as during access, de-fragmentation or garbage collection, but this does not render the storage device as transitory because the data is not transitory while it is stored.

FIG. 1 shows an exemplary computing environment 100 in accordance with disclosed embodiments. Computing environment 100 contains an example of an environment for the execution of at least some of the computer code involved in performing the inventive methods, such as neural network data input monitoring system block 200. In addition to block 200, computing environment 100 includes, for example, computer 101, wide area network (WAN) 102, end user device (EUD) 103, remote server 104, public cloud 105, and private cloud 106. In this embodiment, computer 101 includes processor set 110 (including processing circuitry 120 and cache 121), communication fabric 111, volatile memory 112, persistent storage 113 (including operating system 122 and block 200, as identified above), peripheral device set 114 (including user interface (UI), device set 123, storage 124, and Internet of Things (IoT) sensor set 125), and network module 115. Remote server 104 includes remote database 130. Public cloud 105 includes gateway 140, cloud orchestration module 141, host physical machine set 142, virtual machine set 143, and container set 144.

COMPUTER 101 may take the form of a desktop computer, laptop computer, tablet computer, smart phone, smart watch or other wearable computer, mainframe computer, quantum computer or any other form of computer or mobile device now known or to be developed in the future that is capable of running a program, accessing a network or querying a database, such as remote database 130. As is well understood in the art of computer technology, and depending upon the technology, performance of a computer-implemented method may be distributed among multiple computers and/or between multiple locations. On the other hand, in this presentation of computing environment 100, detailed discussion is focused on a single computer, specifically computer 101, to keep the presentation as simple as possible. Computer 101 may be located in a cloud, even though it is not shown in a cloud in FIG. 1. On the other hand, computer 101 is not required to be in a cloud except to any extent as may be affirmatively indicated.

PROCESSOR SET 110 includes one, or more, computer processors of any type now known or to be developed in the future. Processing circuitry 120 may be distributed over multiple packages, for example, multiple, coordinated integrated circuit chips. Processing circuitry 120 may implement multiple processor threads and/or multiple processor cores. Cache 121 is memory that is located in the processor chip package(s) and is typically used for data or code that should be available for rapid access by the threads or cores running on processor set 110. Cache memories are typically organized into multiple levels depending upon relative proximity to the processing circuitry. Alternatively, some, or all, of the cache for the processor set may be located "off chip." In some computing environments, processor set 110 may be designed for working with qubits and performing quantum computing.

Computer readable program instructions are typically loaded onto computer 101 to cause a series of operational steps to be performed by processor set 110 of computer 101 and thereby effect a computer-implemented method, such that the instructions thus executed will instantiate the methods specified in flowcharts and/or narrative descriptions of computer-implemented methods included in this document (collectively referred to as "the inventive methods"). These computer readable program instructions are stored in various types of computer readable storage media, such as cache 121 and the other storage media discussed below. The program instructions, and associated data, are accessed by processor set 110 to control and direct performance of the inventive methods. In computing environment 100, at least some of the instructions for performing the inventive methods may be stored in block 200 in persistent storage 113.

COMMUNICATION FABRIC 111 is the signal conduction paths that allow the various components of computer 101 to communicate with each other. Typically, this fabric is made of switches and electrically conductive paths, such as the switches and electrically conductive paths that make up busses, bridges, physical input/output ports and the like. Other types of signal communication paths may be used, such as fiber optic communication paths and/or wireless communication paths.

VOLATILE MEMORY 112 is any type of volatile memory now known or to be developed in the future. Examples include dynamic type random access memory (RAM) or static type RAM. Typically, the volatile memory is characterized by random access, but this is not required unless affirmatively indicated. In computer 101, the volatile memory 112 is located in a single package and is internal to computer 101, but, alternatively or additionally, the volatile memory may be distributed over multiple packages and/or located externally with respect to computer 101.

PERSISTENT STORAGE 113 is any form of non-volatile storage for computers that is now known or to be developed in the future. The non-volatility of this storage means that the stored data is maintained regardless of whether power is being supplied to computer 101 and/or directly to persistent storage 113. Persistent storage 113 may be a read only memory (ROM), but typically at least a portion of the persistent storage allows writing of data, deletion of data and re-writing of data. Some familiar forms of persistent storage include magnetic disks and solid state storage devices. Operating system 122 may take several forms, such as various known proprietary operating systems or open source Portable Operating System Interface type operating systems that employ a kernel. The code included in block 200 typically includes at least some of the computer code involved in performing the inventive methods.

PERIPHERAL DEVICE SET 114 includes the set of peripheral devices of computer 101. Data communication connections between the peripheral devices and the other components of computer 101 may be implemented in various ways, such as Bluetooth connections, Near-Field Communication (NFC) connections, connections made by cables (such as universal serial bus (USB) type cables), insertion type connections (for example, secure digital (SD) card), connections made though local area communication networks and even connections made through wide area networks such as the internet. In various embodiments, UI device set 123 may include components such as a display screen, speaker, microphone, wearable devices (such as goggles and smart watches), keyboard, mouse, printer, touchpad, game controllers, and haptic devices. Storage 124 is external storage, such as an external hard drive, or insertable storage, such as an SD card. Storage 124 may be persistent and/or volatile. In some embodiments, storage 124 may take the form of a quantum computing storage device for storing data in the form of qubits. In embodiments where computer 101 is required to have a large amount of storage (for example, where computer 101 locally stores and manages a large database) then this storage may be provided by peripheral storage devices designed for storing very large amounts of data, such as a storage area network (SAN) that is shared by multiple, geographically distributed computers. IoT sensor set 125 is made up of sensors that can be used in Internet of Things applications. For example, one sensor may be a thermometer and another sensor may be a motion detector.

NETWORK MODULE 115 is the collection of computer software, hardware, and firmware that allows computer 101 to communicate with other computers through WAN 102. Network module 115 may include hardware, such as modems or Wi-Fi signal transceivers, software for packetizing and/or de-packetizing data for communication network transmission, and/or web browser software for communicating data over the internet. In some embodiments, network control functions and network forwarding functions of network module 115 are performed on the same physical hardware device. In other embodiments (for example, embodiments that utilize software-defined networking (SDN)), the control functions and the forwarding functions of network module 115 are performed on physically separate devices, such that the control functions manage several different network hardware devices. Computer readable program instructions for performing the inventive methods can typically be downloaded to computer 101 from an external computer or external storage device through a network adapter card or network interface included in network module 115.

WAN 102 is any wide area network (for example, the internet) capable of communicating computer data over non-local distances by any technology for communicating computer data, now known or to be developed in the future. In some embodiments, the WAN may be replaced and/or supplemented by local area networks (LANs) designed to communicate data between devices located in a local area, such as a Wi-Fi network. The WAN and/or LANs typically include computer hardware such as copper transmission cables, optical transmission fibers, wireless transmission, routers, firewalls, switches, gateway computers and edge servers.

END USER DEVICE (EUD) 103 is any computer system that is used and controlled by an end user (for example, a customer of an enterprise that operates computer 101), and may take any of the forms discussed above in connection with computer 101. EUD 103 typically receives helpful and useful data from the operations of computer 101. For example, in a hypothetical case where computer 101 is designed to provide a recommendation to an end user, this recommendation would typically be communicated from network module 115 of computer 101 through WAN 102 to EUD 103. In this way, EUD 103 can display, or otherwise present, the recommendation to an end user. In some embodiments, EUD 103 may be a client device, such as thin client, heavy client, mainframe computer, desktop computer and so on.

REMOTE SERVER 104 is any computer system that serves at least some data and/or functionality to computer 101. Remote server 104 may be controlled and used by the same entity that operates computer 101. Remote server 104 represents the machine(s) that collect and store helpful and useful data for use by other computers, such as computer 101. For example, in a hypothetical case where computer 101 is designed and programmed to provide a recommendation based on historical data, then this historical data may be provided to computer 101 from remote database 130 of remote server 104.

PUBLIC CLOUD 105 is any computer system available for use by multiple entities that provides on-demand availability of computer system resources and/or other computer capabilities, especially data storage (cloud storage) and computing power, without direct active management by the user. Cloud computing typically leverages sharing of resources to achieve coherence and economies of scale. The direct and active management of the computing resources of public cloud 105 is performed by the computer hardware and/or software of cloud orchestration module 141. The computing resources provided by public cloud 105 are typically implemented by virtual computing environments that run on various computers making up the computers of host physical machine set 142, which is the universe of physical computers in and/or available to public cloud 105. The virtual computing environments (VCEs) typically take the form of virtual machines from virtual machine set 143 and/or containers from container set 144. It is understood that these VCEs may be stored as images and may be transferred among and between the various physical machine hosts, either as images or after instantiation of the VCE. Cloud orchestration module 141 manages the transfer and storage of images, deploys new instantiations of VCEs and manages active instantiations of VCE deployments. Gateway 140 is the collection of computer software, hardware, and firmware that allows public cloud 105 to communicate through WAN 102.

Some further explanation of virtualized computing environments (VCEs) will now be provided. VCEs can be stored as "images." A new active instance of the VCE can be instantiated from the image. Two familiar types of VCEs are virtual machines and containers. A container is a VCE that uses operating-system-level virtualization. This refers to an operating system feature in which the kernel allows the existence of multiple isolated user-space instances, called containers. These isolated user-space instances typically behave as real computers from the point of view of programs running in them. A computer program running on an ordinary operating system can utilize all resources of that computer, such as connected devices, files and folders, network shares, CPU power, and quantifiable hardware capabilities. However, programs running inside a container can only use the contents of the container and devices assigned to the container, a feature which is known as containerization.

PRIVATE CLOUD 106 is similar to public cloud 105, except that the computing resources are only available for use by a single enterprise. While private cloud 106 is depicted as being in communication with WAN 102, in other embodiments a private cloud may be disconnected from the internet entirely and only accessible through a local/private network. A hybrid cloud is a composition of multiple clouds of different types (for example, private, community or public cloud types), often respectively implemented by different vendors. Each of the multiple clouds remains a separate and discrete entity, but the larger hybrid cloud architecture is bound together by standardized or proprietary technology that enables orchestration, management, and/or data/application portability between the multiple constituent clouds. In this embodiment, public cloud 105 and private cloud 106 are both part of a larger hybrid cloud.

FIG. 2 is an exemplary ecosystem 201 in accordance with disclosed embodiments. Neural Network Data Input Monitoring System (NNDIMS) 202 comprises a processor 240, a memory 242 coupled to the processor 240, and storage 244. NNDIMS 202 is an electronic computation device. The memory 242 contains program instructions 247, that when executed by the processor 240, perform processes, techniques, and implementations of disclosed embodiments. Memory 242 may include dynamic random-access memory (DRAM), static random-access memory (SRAM), magnetic storage, and/or a read only memory such as flash, EEPROM, optical storage, or other suitable memory, and should not be construed as being a transitory signal per se. In some embodiments, storage 244 may include one or more magnetic storage devices such as hard disk drives (HDDs). Storage 244 may additionally include one or more solid state drives (SSDs). The NNDIMS 202 is configured to interact with other elements of ecosystem 201. NNDIMS 202 is connected to network 224, which is the Internet, a wide area network, a local area network, or other suitable network.

Ecosystem 201 may include one or more client devices, indicated as 216. Client device 216 can include a laptop computer, desktop computer, tablet computer, or other suitable computing device. Client device 216 may be used to configure NNDIMS, including features such as configuring drift detection parameters and/or receiving alerts from the NNDIMS 202.

Ecosystem 201 may include machine learning system 217. The machine learning system 217 can include, but is not limited to, a convolutional neural network (CNN), Support Vector Machine (SVM), Decision Tree, Recurrent Neural Network (RNN), Long Short Term Memory Network (LSTM), Radial Basis Function Network (RBFN), Multilayer Perceptron (MLP), and/or other suitable neural network type. In embodiments, the machine learning system 217 is trained using supervised learning techniques. In disclosed embodiments, the machine learning system 217 may be used for image classification, natural language processing, predictive modeling, and/or other predictive/classification tasks. The machine learning system 217 may be trained using supervised learning techniques.

Ecosystem 201 may include data source devices 260. The data source devices 260 can include edge devices. A variety of data source devices can participate in ecosystem 201, including mobile communication devices 261, which can include smartphones. The data source devices can include premises devices 262. The premises devices 262 can include environmental sensors, such as temperature sensors, humidity sensors, motion sensors, and so on. The data source devices can include camera devices 263. The camera devices 263 can include surveillance cameras, infrared cameras, webcams, and so on. The data source devices can include peripheral devices within vehicles 264. The peripheral devices within vehicles 264 can include onboard devices that generate data including, but not limited to, location data, velocity data, direction data, operating parameters such as engine parameters, battery charge level, and so on. The data source devices can include industrial telemetry 265. The industrial telemetry 265 can include data from log files, and/or exposed by APIs, to indicate the operational status of industrial equipment such as manufacturing equipment, and the like. Other types of data source devices may also be included in data source devices collectively indicated as 260. The data in the data source devices 260 may be sent to data store 267 for storage. Some of the data in data store 267 may be applied to machine learning system 217 as training data, and/or test/validation data. Once trained, machine learning system 217 may continue to receive data from data source devices 260, and machine learning system 217, once trained, may provide output data based on the input data.

Data store 267 may include one or more storage devices, and or database repositories. The database repositories can include SQL databases, mongoDB, and/or other suitable database schemas and/or storage formats. The data store 267 may include raw data. The raw data is data received from data source devices 260, and may be supplied to machine learning system 217 in raw form, or with additional preprocessing prior to providing the data to the machine learning system 217. The preprocessing can include filtering, removing of duplicate data, handling missing/incomplete data, and so on.

Ecosystem 201 includes data density machine learning system 232. In embodiments, the data density machine learning system 232 comprises a generative adversarial network (GAN). In some embodiments, the generative adversarial network includes a CycleGAN neural network.

CycleGAN is a generative adversarial network (GAN) architecture that can learn the mapping between two different domains. The key idea behind CycleGAN is to use a pair of generator-discriminator models, to learn the mapping between the two domains. The generator network takes data from one domain as input and generates a corresponding dataset in the other domain, while the discriminator network tries to distinguish between the generated data and real data from the target domain. This adversarial process continues until the generator produces data that is indistinguishable from the real images in the target domain.

CycleGAN is named so because it adds a "cycle consistency loss" to the standard GAN loss, which ensures that the generated datasets can be transformed back into their original form. This helps to enable the generator to produce meaningful translations, rather than simply memorizing a few specific examples. In embodiments, the CycleGAN is used to identify high-density regions in multidimensional input data.

In some embodiments, the data density machine learning system 232 comprises an autoencoder. An autoencoder is a type of neural network that is designed to learn a compact representation of an input data in an unsupervised manner. It includes two main components, an encoder and a decoder. The encoder takes the input data and maps it to a lower-dimensional representation, called the code or latent representation, which captures the most important features or structure of the data. The decoder then maps the code back to an output that approximates the original input data.

The autoencoder is trained to minimize the reconstruction error between the input data and the output, effectively learning to reconstruct the input as accurately as possible.

During training, the encoder is forced to learn a compact representation of the input data, as the code must be able to capture the information needed to reconstruct the input. In some embodiments, the autoencoder comprises a deep autoencoder, variational autoencoder, or denoising autoencoder. In embodiments, the autoencoder is used to identify high-density regions in multidimensional input data.

Embodiments use high-density regions for detecting data and/or concept drift, since they contain a meaningful number of samples, and therefore, reduce the risk of incorrect analysis due to outlier data. In addition to being multidimensional, the data may also be multivariate and/or multimodal. Multivariate data refers to data that has more than one variable. For example, a dataset containing information about height, weight, and age of a group of people is an example of multivariate data. The multiple variables in this dataset allow for the exploration of relationships and patterns between the variables. Multimodal data includes data that comes from multiple sources or modalities. For example, a dataset that contains both text and images, or text and audio, is an example of multimodal data. Multimodal data is becoming increasingly common as more and more data is generated from multiple sources, such as social media platforms, IoT sensors, and/or other data sources.

Figure 3:
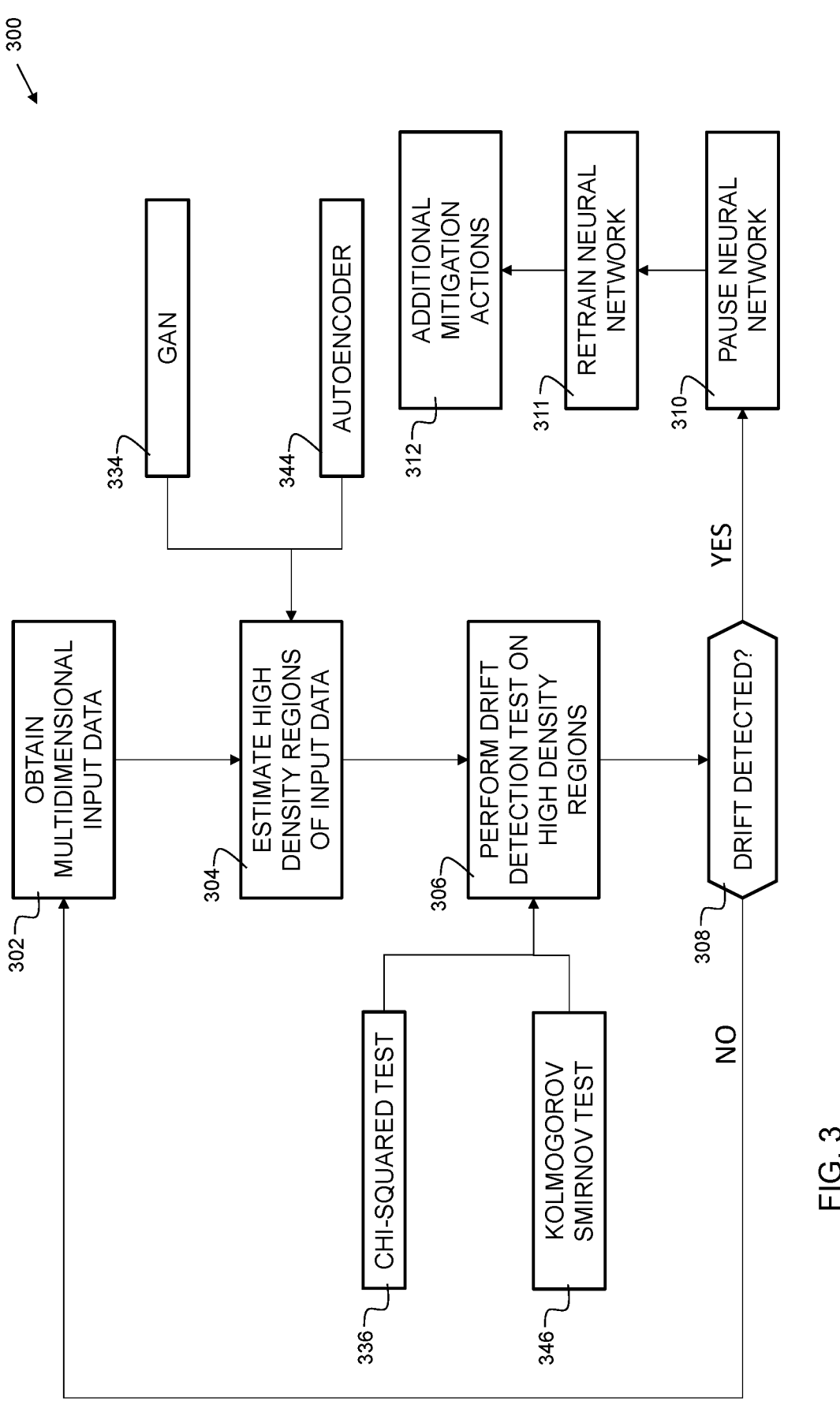
FIG. 3 is a flowchart indicating process steps for embodiments of the present invention.

FIG. 3 is a flowchart 300 indicating process steps for embodiments of the present invention. At 302, multidimensional input data is obtained. The multidimensional input data has a dimensionality of N. In some embodiments, N ranges between 5 and 20. The multidimensional input data can include multivariate and/or multimodal data. The input data can be from sensors such as IoT sensors, telemetry data, text data from log files, websites, and/or other sources. At 304, high-density regions of the multidimensional input data are estimated. While estimating high-density regions in a single dimension can be straightforward, estimating high-density regions in multidimensional input data of dimension N, where N has a value greater than or equal to 5 is challenging. Disclosed embodiments utilize a dedicated neural network, such as a GAN 334, and/or autoencoder 344 to identify high-density regions.

At 306, a statistical drift detection test is performed in the high-density regions. In embodiments, the drift detection is performed using a Kolmogorov-Smirnov (KS) test 346. In embodiments, the KS test can be used to determine if two samples are significantly different from each other. The Kolmogorov-Smirnov test may also be used to test whether two underlying one-dimensional probability distributions differ, and thus, is well-suited as a test to determine if two samples are significantly different from each other. The KS test quantifies a distance between the empirical distribution function of the sample and the cumulative distribution function of the reference distribution, or between the empirical distribution functions of two samples. By applying the KS test to regions of high-density, the risk of poor neural network performance due to acting on outlier data is mitigated.

In some embodiments, another statistical test, such as the Chi-squared test 336 may be used instead of, or in addition to, the KS test 346. In embodiments, a chi-square test is used to test hypotheses. Embodiments perform hypothesis testing for drift detection. The hypothesis can be that the data does or does not belong to a given dataset. If the test indicates that the data belongs to the dataset, then the data is considered to have not drifted. If instead, the test indicates that the data does not belong to the data set, then the data is considered to have drifted. The chi-square statistic compares the size of any discrepancies between the expected results and the actual results, given the size of the sample and the number of variables in the relationship.

Other embodiments may utilize other statistical tests, instead of, or in addition to, the KS test 346 and/or chi-squared test 336. These tests can include, but are not limited to, the Anderson-Darling test, Cramer-von Mises test, and/or Wilcoxon rank-sum test. In embodiments, the choice of test can be based on the requirements of the data and the hypothesis being tested, such as the distributional assumptions, the size of the sample, and the level of sensitivity desired.

At 308, a check is made to determine if drift is detected. The detection of drift can be determined by comparing the output of the drift detection test at 306 to a predetermined threshold. If no at 308 (the output of the drift detection test at 306 is less than the predetermined threshold), then the process returns to 302 to continue the monitoring of input data. If yes at 308 (the output of the drift detection test at 306 is greater than or equal to the predetermined threshold), then the process continues to 310 where the neural network is paused. Pausing the neural network means that it is temporarily not being used to evaluate input data, so that retraining can occur at 311. The retraining is performed using new input data, so that the relationship changes between variables/dimensions within the new input data are accounted for in the training of the neural network. The flow then continues to 312 where additional mitigation actions are optionally performed. The mitigation actions at 312 can include, but are not limited to, alerting stakeholders such as managers and/or administrators via e-mail, text messaging, or other suitable alerting mechanism. In addition to monitoring input data, disclosed embodiments may also monitor, and check for drift on the output data of a neural network.

Figure 4:
FIG. 4 is a block diagram indicating additional embodiments of the present invention.

FIG. 4 is a block diagram 400 indicating additional embodiments of the present invention. The physical system at 402 can include a sensor array, text data from log files, data from websites, and/or other physical system. Input data 404 can be multidimensional, multivariate, and/or multimodal input data. At 406, high-density regions are estimated using deep learning techniques. At 408, hypotheses are stored. The hypotheses can include hypothesis H0, that the data does belong to (or is consistent with) the original training set (data that was used previously in training of the neural network), and thus, the data did not drift. The hypotheses can include hypothesis H1, that the data does not belong to (or is not consistent with) the original training set, and thus, the data did drift. At 410, the KS test is performed, and p-values (probability values) that the data did drift are determined at 412. The p-values range from 0 to 1, with 0 indicating that the data did not drift, and 1 indicating that the data did drift. Values in between 0 and 1 indicate a probability that the data drifted. As an example, a p-value of 0.72 indicates a 72 percent likelihood that the data did drift. At 414, the neural network is periodically/continuously monitored to determine if drift has occurred. At 416, drift is detected. In response to detecting drift, at 418, mitigation steps are executed. The mitigation steps can include, but are not limited to, pausing the neural network, retraining the neural network, and/or alerting stakeholders about the detected drift.

Figures 5, 6:
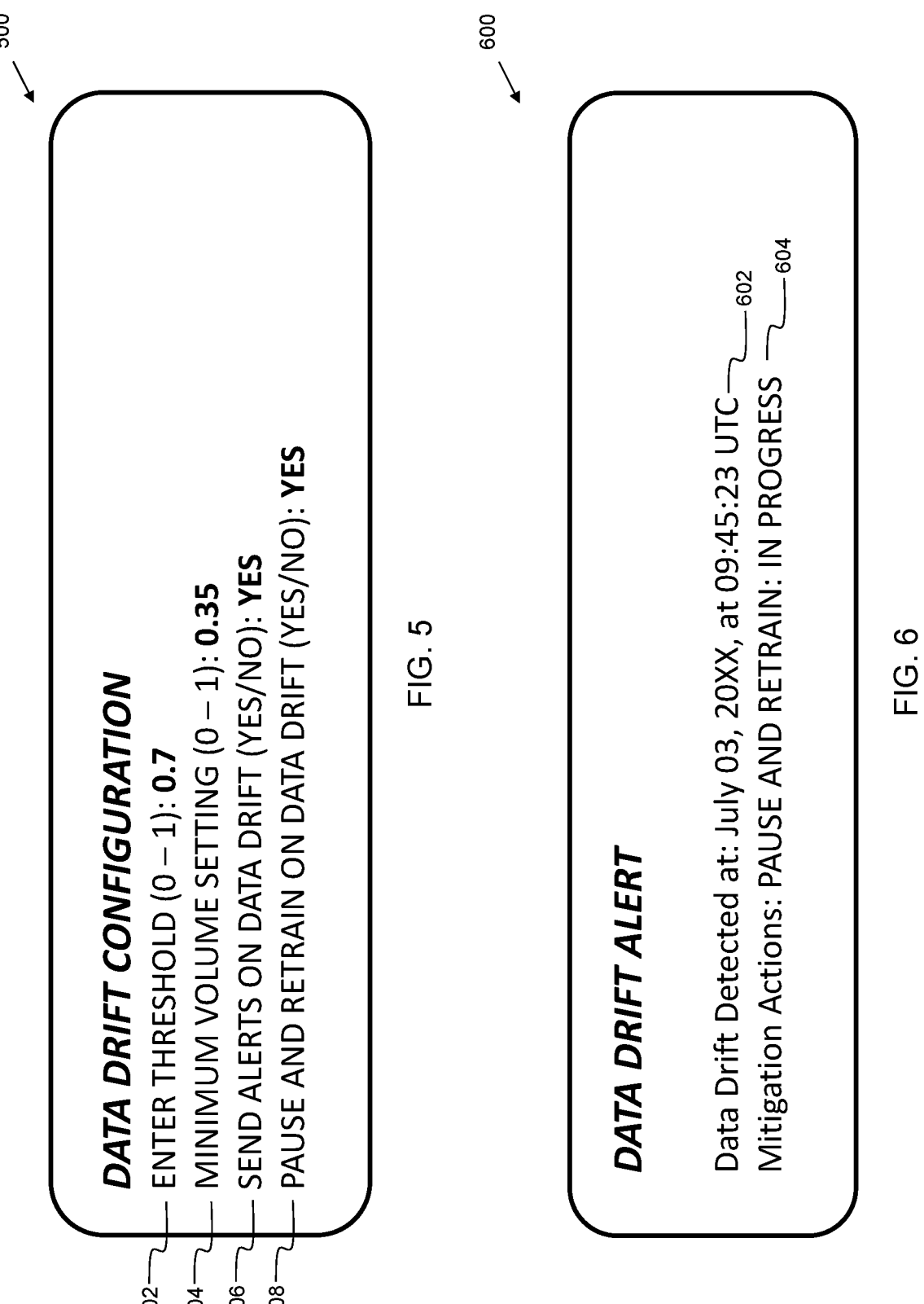
FIG. 5 is an exemplary user interface for configuration in accordance with embodiments of the present invention.
FIG. 6 is an exemplary alert user interface in accordance with embodiments of the present invention.

FIG. 5 is an exemplary user interface 500 for configuration in accordance with embodiments of the present invention. The user interface may be implemented as an HTML web page rendered on a client such as client device 216 in FIG. 2. The configuration can include a threshold setting 502. In embodiment, the threshold setting can be a value ranging from 0 to 1. The lower the number, the more sensitive the NNDIMS 202 (FIG. 2) is to drift. The setting chosen can depend on the application. For applications where minor drift warrants retraining, a lower threshold can be used. Conversely, for applications where major drift warrants retraining, a higher threshold can be used.

The configuration can include a minimum volume setting 504. The minimum volume setting can be a value indicating a density level. Thus, the minimum volume setting enables specification of what data regions qualify as high-density regions. In embodiments, a lower value increases the number of high-density regions found. Conversely, a higher value decreases the number of high-density regions found. For applications with just a few high-density regions in a sparse dataset, a higher minimum volume setting can be used. Conversely, for applications with many high-density regions in a dataset, a lower minimum volume setting can be used to filter out all but the highest density regions.

The configuration can include an alert setting 506. This setting can be used to control sending of alerts pertaining to data drift and/or concept drift. In embodiments, if the setting is enabled (YES), then alerts via e-mail, text message, instant message, and/or other suitable techniques are issued. If the setting is disabled (NO), then alerts are not sent when drift is detected. The configuration can include a pause and retrain option 508. If enabled (YES), then the neural network is paused and retrained upon detecting data drift and/or concept drift. In embodiments, once retrained, the neural network is automatically unpaused, so that the re-trained neural network can begin processing and analyzing new input data. If the option is disabled (NO), then the neural network is not paused and retrained upon detecting data drift and/or concept drift.

FIG. 6 is an exemplary alert user interface 600 in accordance with embodiments of the present invention. Alert message 602 is a data drift alert that indicates an occurrence of data drift, and includes a timestamp. The mitigation actions 604 indicate pause and retrain is in progress. The user interface 600 is exemplary, and other information may be included in some embodiments.

As can now be appreciated, disclosed embodiments provide improvements in the technical field of neural network performance. Multidimensional input data is obtained, and a neural network, such as a deep learning neural network, is used to identify one or more high-density regions in the input data. The high-density regions are then analyzed with a mathematical test such as a KS test in order to make a drift detection determination. In response to detecting drift of input and/or output data to/from a neural network, mitigation actions are performed, including, but not limited to, pausing and retraining of the neural network, automatic unpausing of a retrained neural network, and/or notification/alert message dissemination regarding drift detection.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A computer-implemented method for monitoring performance of a neural network, comprising:

obtaining input data, wherein the input data comprises multidimensional data;

estimating at least one high-density region of the input data, wherein a high-density region is a data region of the input data that has a data volume value that exceeds a minimum data volume value threshold;

performing a statistical drift detection test on the at least one high-density region; and in response to detecting a drift, executing at least one mitigation action, wherein the at least one mitigation action includes:

temporarily pausing the neural network, the pausing preventing the neural network from evaluating new input data during a retraining phase of the neural network;

retraining, while the neural network is temporarily paused, the neural network using the new input data; and automatically unpausing the retrained neural network after the retraining has been completed.

2. The method of claim 1, wherein the drift detection test comprises a Kolmogorov-Smirnov test.

3. The method of claim 1, wherein the drift detection test comprises a Chi-squared test.

4. The method of claim 1, wherein the at least one mitigation action includes issuing a data drift alert.

5. The method of claim 1, wherein detecting the drift comprises detecting a data drift.

6. The method of claim 1, wherein detecting the drift comprises detecting a concept drift.

7. The method of claim 1, wherein estimating the at least one high-density region is performed with a second neural network.

8. The method of claim 7, wherein the second neural network comprises an autoencoder.

9. The method of claim 7, wherein the second neural network comprises a generative adversarial network.

10. The method of claim 9, wherein the second neural network comprises a CycleGAN neural network.

11. The method of claim 1, wherein the input data comprises multivariate data.

12. The method of claim 11, wherein the input data comprises multimodal data.

13. An electronic computation device comprising:

a processor; and a memory coupled to the processor, the memory containing instructions, that when executed by the processor, cause the electronic computation device to:

obtain input data, wherein the input data comprises multidimensional data;

estimate at least one high-density region of the input data, wherein a high-density region is a data region of the input data that has a data volume value that exceeds a minimum data volume value threshold;

perform a statistical drift detection test on the at least one high-density region; and in response to detecting a drift, execute at least one mitigation action, wherein the at least one mitigation action includes:

temporarily pausing a neural network, the pausing preventing the neural network from evaluating new input data during a retraining phase of the neural network;

retraining, while the neural network is temporarily paused, the neural network using the new input data; and automatically unpausing the retrained neural network after the retraining has been completed.

14. The electronic computation device of claim 13, wherein the memory further comprises instructions, that when executed by the processor, cause the electronic computation device to perform the drift detection test using a Kolmogorov-Smirnov test.

15. The electronic computation device of claim 13, wherein the memory further comprises instructions, that when executed by the processor, cause the electronic computation device to perform the drift detection test using a Chi-squared test.

16. The electronic computation device of claim 13, wherein the memory further comprises instructions, that when executed by the processor, cause the electronic computation device to estimate the at least one high-density region using a second neural network.

17. A computer program product for an electronic computation device comprising a computer readable storage medium having program instructions embodied therewith, the program instructions executable by a processor to cause the electronic computation device to:

obtain input data, wherein the input data comprises multidimensional data;

estimate at least one high-density region of the input data, wherein a high-density region is a data region of the input data that has a data volume value that exceeds a minimum data volume value threshold;

perform a statistical drift detection test on the at least one high-density region; and in response to detecting a drift, execute at least one mitigation action, wherein the at least one mitigation action includes:

temporarily pausing the neural network, the pausing preventing the neural network from evaluating new input data during a retraining phase of the neural network;

retraining, while the neural network is temporarily paused, the neural network using the new input data; and automatically unpausing the retrained neural network after the retraining has been completed.

18. The computer program product of claim 17, wherein the computer readable storage medium further comprises program instructions, that when executed by the processor, cause the electronic computation device to perform the drift detection test using a Kolmogorov-Smirnov test.

19. The computer program product of claim 17, wherein the computer readable storage medium further comprises program instructions, that when executed by the processor, cause the electronic computation device to estimate the at least one high-density region using a second neural network.

* * * * *